United States Patent
Brons et al.

(10) Patent No.: US 8,639,676 B2
(45) Date of Patent: *Jan. 28, 2014

(54) DATA LIBRARY OPTIMIZATION

(75) Inventors: Dale R. Brons, Northglenn, CO (US); Randy S. Johnson, Ofallon, MO (US); Tedrick N. Northway, Wood River, IL (US)

(73) Assignee: International Business Machines Corporation, Armonk, NY (US)

(*) Notice: Subject to any disclaimer, the term of this patent is extended or adjusted under 35 U.S.C. 154(b) by 61 days.

This patent is subject to a terminal disclaimer.

(21) Appl. No.: 12/872,748

(22) Filed: Aug. 31, 2010

(65) Prior Publication Data

US 2010/0325116 A1   Dec. 23, 2010

Related U.S. Application Data

(63) Continuation of application No. 11/939,532, filed on Nov. 13, 2007, now Pat. No. 7,836,030.

(51) Int. Cl.
    *G06F 17/00* (2006.01)
(52) U.S. Cl.
    USPC .......................................................... 707/696
(58) Field of Classification Search
    None
    See application file for complete search history.

(56) References Cited

U.S. PATENT DOCUMENTS

| | | | |
|---|---|---|---|
| 4,310,883 A * | 1/1982 | Clifton et al. | 1/1 |
| 4,467,421 A | 8/1984 | White | |
| 4,987,533 A * | 1/1991 | Clark et al. | 1/1 |
| 5,315,708 A | 5/1994 | Eidler et al. | |
| 5,367,698 A * | 11/1994 | Webber et al. | 709/203 |
| 5,566,348 A * | 10/1996 | Dahman et al. | 710/18 |
| 5,784,646 A * | 7/1998 | Sawada | 710/38 |
| 5,900,007 A * | 5/1999 | Nunnelley et al. | 711/4 |
| 6,029,230 A * | 2/2000 | Ng | 711/159 |
| 6,085,262 A * | 7/2000 | Sawada | 710/38 |
| 6,324,497 B1 * | 11/2001 | Yates et al. | 703/24 |
| 6,463,513 B1 | 10/2002 | Bish et al. | |
| 6,745,212 B2 | 6/2004 | Kishi et al. | |
| 6,779,058 B2 * | 8/2004 | Kishi et al. | 710/60 |
| 6,880,051 B2 | 4/2005 | Timpanaro-Perrotta | |
| 7,058,958 B1 | 6/2006 | Shutt et al. | |
| 7,213,110 B2 * | 5/2007 | Nakayama et al. | 711/143 |
| 7,310,883 B1 * | 12/2007 | Park | 33/1 C |
| 8,055,870 B2 * | 11/2011 | Bitner et al. | 711/162 |
| 2002/0196917 A1 * | 12/2002 | Kesten et al. | 379/100.11 |
| 2003/0004920 A1 * | 1/2003 | Coverston et al. | 707/1 |

(Continued)

OTHER PUBLICATIONS

Le, Office Communication for U.S. Appl. No. 11/939,532 dated Feb. 4, 2010, 13 pages.

(Continued)

*Primary Examiner* — Hung Le
(74) *Attorney, Agent, or Firm* — Matthew Chung; Hoffman Warnick LLC

(57) ABSTRACT

The invention provides a method, system, and program product for optimizing a data library. A first aspect of the invention provides a method of optimizing a data library, comprising: moving a plurality of data files from a plurality of data library volumes to a staging area; sorting the data files into a plurality of directories based on at least one criterion of the data files; transferring data files from a first directory in the staging area to a transfer medium; deleting the first directory; transferring data files from a second directory in the staging area to a transfer medium; and deleting the second directory.

18 Claims, 3 Drawing Sheets

(56) References Cited

U.S. PATENT DOCUMENTS

| | | | |
|---|---|---|---|
| 2004/0042044 A1* | 3/2004 | Kesten et al. | 358/1.15 |
| 2005/0125836 A1* | 6/2005 | Estevez et al. | 725/105 |
| 2008/0052316 A1* | 2/2008 | Rangadass | 707/104.1 |
| 2008/0082769 A1 | 4/2008 | Bouchou et al. | |
| 2008/0270166 A1* | 10/2008 | Morin et al. | 705/1 |
| 2009/0106331 A1* | 4/2009 | Fridman et al. | 707/204 |
| 2010/0106838 A1* | 4/2010 | Segev et al. | 709/226 |
| 2011/0197237 A1* | 8/2011 | Turner | 725/78 |

OTHER PUBLICATIONS

Le, Notice of Allowance and Fee(s) Due for U.S. Appl. No. 11/939,532 dated Jul. 13, 2010, 10 pages.

* cited by examiner

DATA LIBRARY OPTIMIZATION

CROSS-REFERENCE TO RELATED APPLICATIONS

This application is a continuation of U.S. patent application Ser. No. 11/939,532, filed 13 Nov. 2007 now U.S. Pat. No. 7,836,030, which is hereby incorporated herein and to which the right of priority is hereby claimed.

TECHNICAL FIELD

The invention relates generally to the transfer of data libraries and, more particularly, to the optimized transfer of data libraries, such that the contents of the data libraries are optimally organized. Such organization may be, for example, according to creation date, modification date, size, or sequence number of individual data files.

BACKGROUND OF THE INVENTION

In many businesses, data libraries can be quite large, constituting a significant portion of a company's computing service budget and effort. In addition, significant portions of a data library may be archived, often in a way that is quite inefficient when individual data files need to be retrieved. For example, related data files or portions of data files (e.g., those created or accessed on the same day) may be stored on separate storage devices (e.g., optical drives, tapes, etc.). Thus, when a data file or a group of related data files must be retrieved from the data library, it may be necessary to access and/or restore the contents of multiple storage devices.

Even on a single storage device, related data files may be stored at some distance from each other. This is particularly problematic for serially-accessed media, such as tape, since the entire length of the tape may have to be traveled in order to retrieve disparately stored data files. As noted above, if the needed data files are stored on multiple storage devices or on archived storage devices, restoring these data files can be quite labor-intensive and costly.

One reason that storage on tapes or similar storage devices becomes inefficient is that files archived onto a tape expire at different times. As a result, tapes are only partially used and not reused until all files have expired.

Accordingly, there exists a need in the art to overcome the deficiencies and limitations described hereinabove.

SUMMARY OF THE INVENTION

The invention provides a method, system, and program product for optimizing a data library.

A first aspect of the invention provides a method of optimizing a data library, comprising: moving a plurality of data files from a plurality of data library volumes to a staging area; sorting the data files into a plurality of directories based on at least one criterion of the data files; transferring data files from a first directory in the staging area to a transfer medium; deleting the first directory; transferring data files from a second directory in the staging area to a transfer medium; and deleting the second directory.

A second aspect of the invention provides a system for optimizing a data library, comprising: a system for moving a plurality of data files from a plurality of data library volumes to a staging area; a system for sorting the data files into a plurality of directories based on at least one criterion of the data files; a system for transferring data files from a first directory in the staging area to a transfer medium; a system for deleting the first directory; a system for transferring data files from a second directory in the staging area to a transfer medium; and a system for deleting the second directory.

A third aspect of the invention provides a program product stored on a computer-readable medium, which when executed, optimizes a data library, the program product comprising: program code for moving a plurality of data files from a plurality of data library volumes to a staging area; program code for sorting the data files into a plurality of directories based on at least one criterion of the data files; program code for transferring data files from a first directory in the staging area to a transfer medium; program code for deleting the first directory; program code for transferring data files from a second directory in the staging area to a transfer medium; and program code for deleting the second directory.

A fourth aspect of the invention provides a method for deploying an application for optimizing a data library, comprising: providing a computer infrastructure being operable to: move a plurality of data files from a plurality of data library volumes to a staging area; sort the data files into a plurality of directories based on at least one criterion of the data files; transfer data files from a first directory in the staging area to a transfer medium; delete the first directory; transfer data files from a second directory in the staging area to a transfer medium; and delete the second directory.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
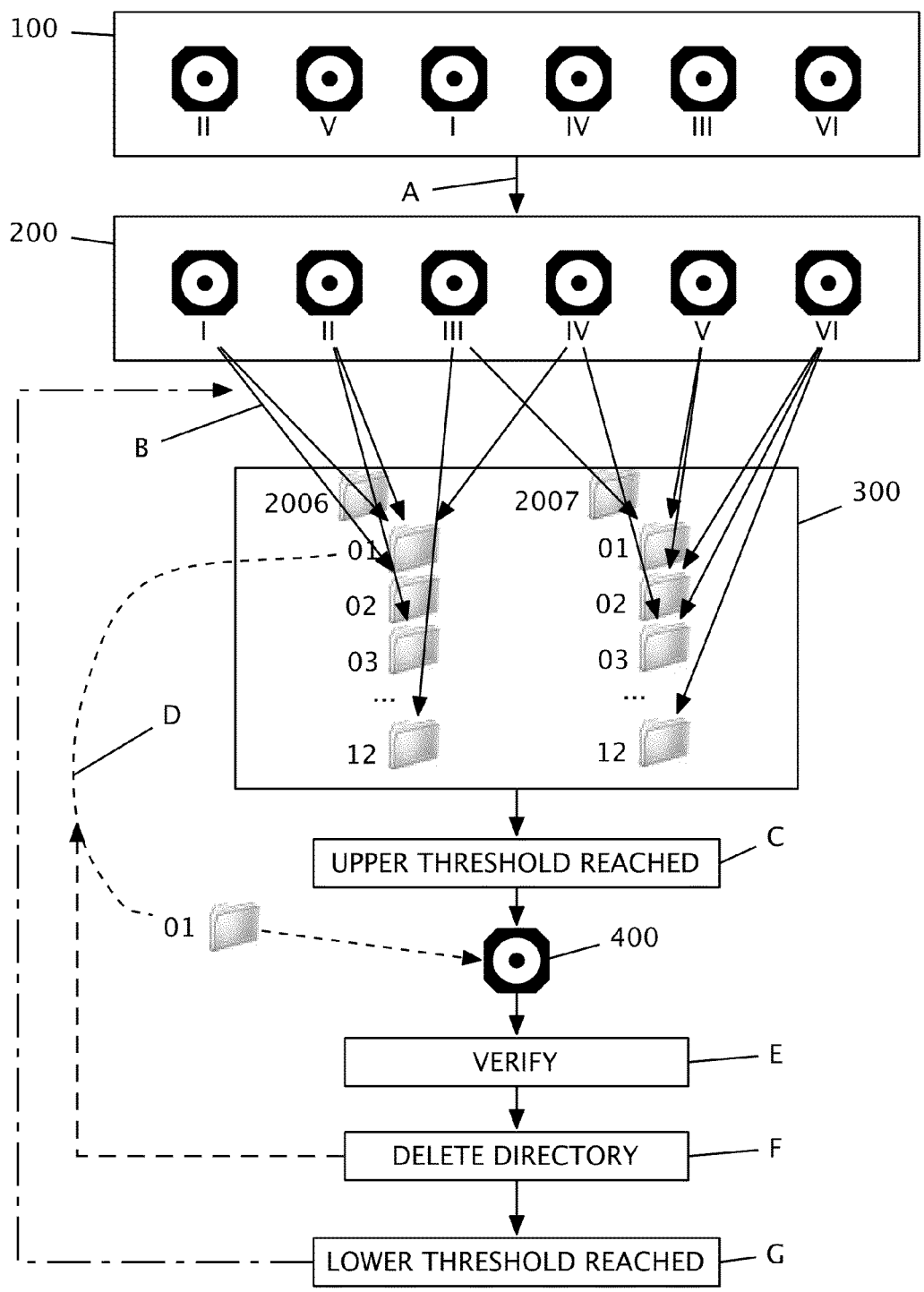
FIG. 1 shows a block and flow diagram of an illustrative method according to the invention.

Referring now to the drawings, FIG. 1 shows a block and flow diagram of an illustrative embodiment of the invention. Data library 100 includes six volumes, I-VI. Typically, volumes I-VI comprise tapes or similar storage media upon which data files are stored. Volumes I-VI are numbered sequentially according to the relative ages of the data files they contain. That is, volume I contains at least one data file older than the oldest data file on volume II, which contains at least one data file older than the oldest data file on volume III, et cetera. For purposes of illustration, data files are described with respect to their relative ages (e.g., creation dates), but any other criterion or combination of criteria may similarly be used, such as creation time, modification date, modification time, archive date, archive time, file size, file format, or sequence number.

In data library 100, volumes I-VI are not ordered according to the relative ages of their data files. At A, volumes I-VI are optionally ordered according to the relative ages of the data files they contain, such that ordered data library 200 is produced, with volume I containing at least one data file older than the oldest data file contained in volume II, et cetera, as described above. By so ordering volumes I-VI, the subsequent moving B of data files from each of volumes I-VI to a staging area 300, described below, may be better optimized. It should be noted that while such ordering of volumes often improves the efficiency and overall optimization of the described methods, such ordering is not essential. That is, a data library may be optimized according to the invention without such ordering of volumes.

While described here as "moving" data files, it should be recognized that the term includes the transfer (i.e., writing the data files to the staging area 300 with contemporaneous or subsequent deletion of the data files from the volume(s)) or the copying (i.e., writing the data files to the staging area 300 without deletion of the data files from the volume(s)) of data files.

Staging area 300 comprises a storage medium to which data files from volumes I-VI are moved (i.e., transferred or copied) for optimized organization and, ultimately, transfer to a transfer medium, as will be described below. Any known or later-developed storage medium may be employed, including, for example, a hard drive, and optical drive, a flash drive, or a tape medium.

As shown in FIG. 1, staging area 300 includes a number of directories into which individual data files are organized when moved B from volumes I-VI to staging area 300. Here, directories are based on dates, i.e., the ages of data files, as described above. Thus, as shown in FIG. 1, volume I includes data files having creation dates in January and February 2006 and are therefore moved into subdirectories 01 and 02 of directory 2006. Similarly, volume II includes data files having creation dates in January and March 2006 and are therefore moved into subdirectories 01 and 03 of directory 2006.

Proper ordering of data files may be aided, for example, by editing the names of the data files to include a date/time stamp, sequence number, or whatever other criterion or criteria the data files are sorted by. Similarly, the name of each data file may be edited once the data file has been moved to staging area 300 and sorted into the appropriate directory or subdirectory. For example, a "ready" extension may be added to each file name, signifying that the file is ready for transfer to a transfer medium 400, as will be described in greater detail below.

The size of staging area 300 may also be optimized according to the invention. If, for example, volumes I-VI comprised the entire data library to be transferred and each volume contained 200 GB of data, the size of staging area 300 would be optimized according to the equation:

Optimal Size=(number of filling volumes*size of volume)/upper utilization threshold In the equation above, the number of filling volumes is the number of volumes being written to. That is, volumes making up the data library but which are not being filled (i.e., are full or unused) are excluded when determining the optimal size of staging area 300.

The upper utilization threshold is the point at which data files moved to staging area 300 are then transferred to a transfer medium 400 in an optimized arrangement. Thus, in the example above, if the data files are to be transferred once staging area 300 is 90% full, the optimal size of staging area 300 is:

Optimal Size=(6*200 GB)/0.90=1.333 TB

Thus, once 90% of the storage capacity of staging area 300 is met at C, data files from the oldest directory (i.e., January 2006 in the example shown in FIG. 1) are transferred D to the transfer medium 400. The transferred data files may then be verified at E and, if verified, the directory may be deleted from the staging area 300 at F. This process may then continue for data files in the oldest remaining directory (i.e., February 2006 in the example shown in FIG. 1) by iteratively looping D through F until a lower threshold (e.g., 50% of the storage capacity of staging area 300) is reached at G. Once all data files have been moved B to staging area 300, the lower threshold may be set to 0%, such that D through G are looped until all data files have been transferred to transfer medium 400 in an optimized format.

As can be seen in the above example, the data files transferred to transfer medium 400 are optimized in that they are transferred and recorded in a substantially sequential order according to their creation dates. Thus, retrieving a data file from transfer medium 400 is much more efficient than from data library 100 or even ordered data library 200, where sequentially created data files may be spread across many volumes and within individual volumes. Such optimization is particularly beneficial where transfer medium 400 and/or volumes I-VI are serial-access media, such as tape.

Figure 2:
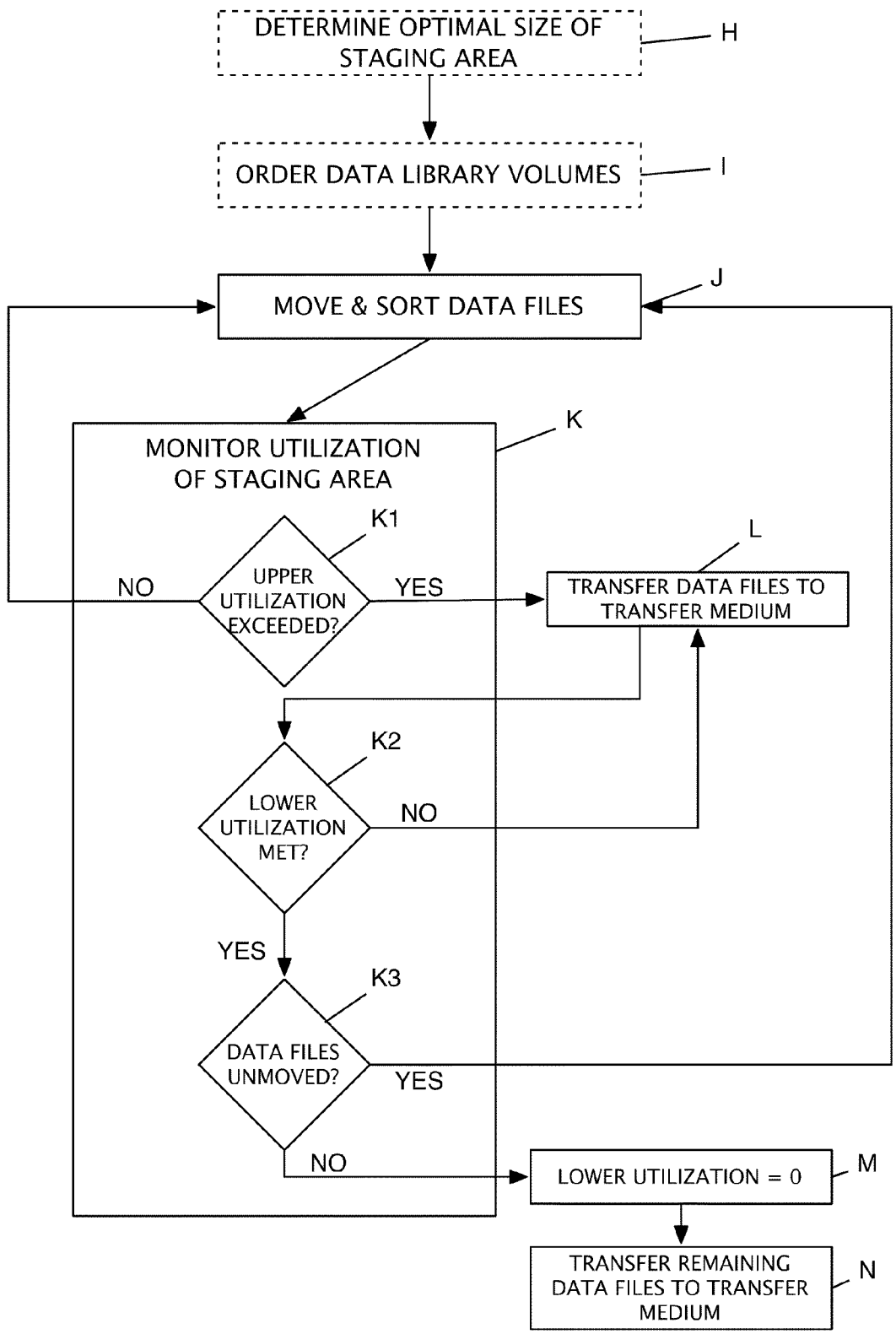
FIG. 2 shows a flow diagram of an illustrative method according to the invention.

FIG. 2 shows a flow diagram of an illustrative method according to the invention, aspects of which are described above. At H, the optimal size of the staging area is optionally determined, according to which the data library volumes are ordered at I. At J, data files are moved to the staging area and sorted into directories or subdirectories according to one or more data file criteria.

At K, the utilization of the staging area is monitored. This may include, for example, determining whether an upper utilization threshold of the staging area has been exceeded at K1. If so, i.e., YES at K1, data files are transferred from the staging area to a new transfer medium at L. If not, i.e., NO at K1, J through K1 may be looped.

At K2, it is determined whether a lower utilization threshold of the staging area has been met. If not, i.e., NO at K2, data file transfer is continued at L until the lower utilization threshold is met. Once the lower utilization threshold is met, i.e., YES at K2, it is determined at K3 whether additional data files remain in the volumes that have not been moved to the staging area. If so, i.e., YES at K3, J through K3 may be looped. If not, i.e., NO at K3, the lower utilization threshold is set to 0 at M and the data files remaining in the staging area are transferred to the transfer medium at N.

Figure 3:
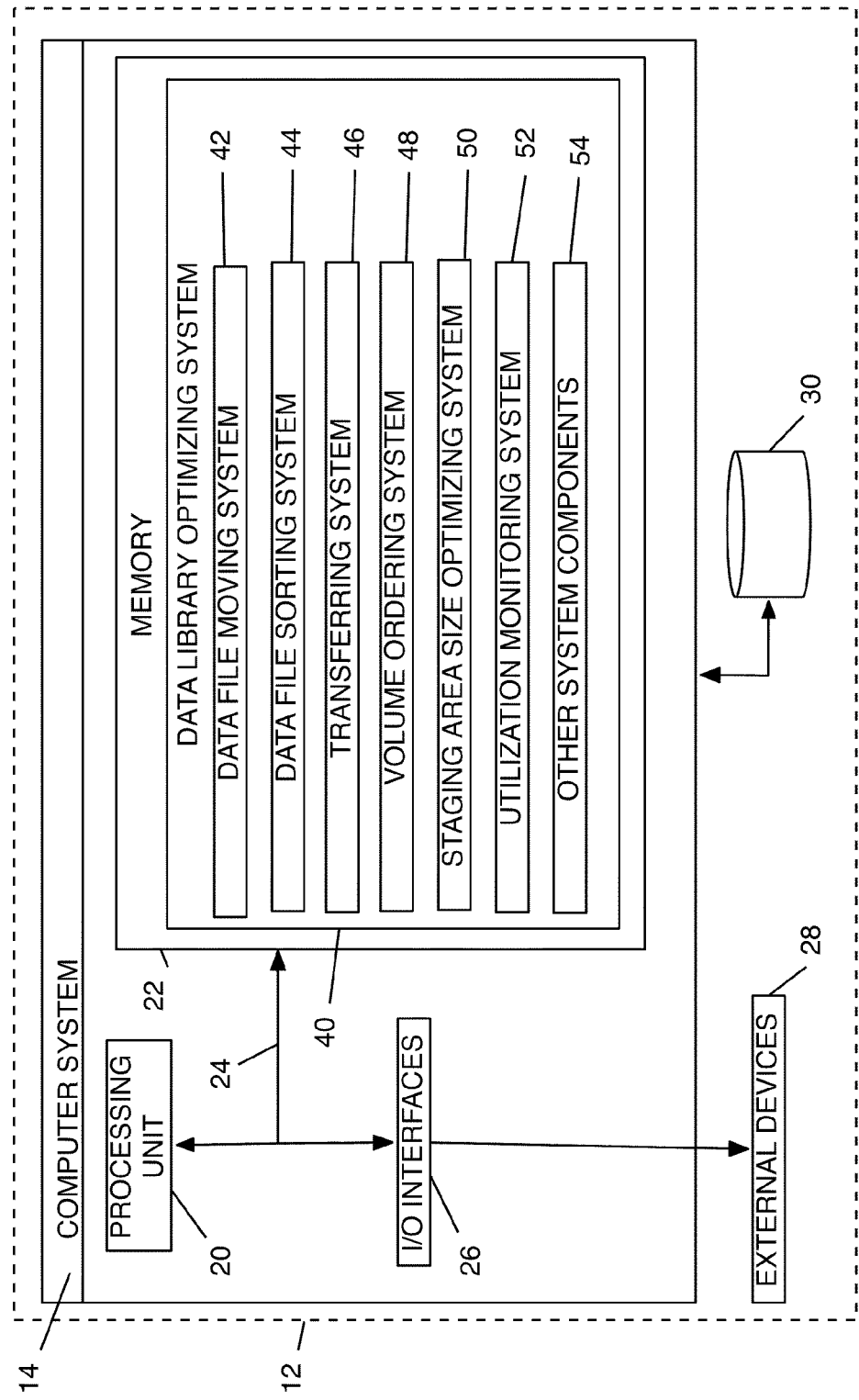
FIG. 3 shows a block diagram of an illustrative system according to the invention.

FIG. 3 shows an illustrative system 10 for optimizing a data library. To this extent, system 10 includes a computer infrastructure 12 that can perform the various process steps described herein for optimizing a data library. In particular, computer infrastructure 12 is shown including a computer system 14 that comprises a data library optimizing system 40, which enables computer system 14 to optimize a data library by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as data library optimizing system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and data library optimizing system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, data library optimizing system 40 enables computer system 14 to optimize a data library. To this extent, data library optimizing system 40 is shown including a data file moving system 42, a data file sorting system 44, a transferring system 46, a volume ordering system 48, a staging area size optimizing system 52, and a utilization monitoring system 52. Operation of each of these systems is discussed above. Data library optimizing system 40 may further include other system components 54 to provide additional or improved functionality to data library optimizing system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for optimizing a data library, it is understood that the invention further provides various alternative embodiments. For example, in one embodiment, the invention provides a computer-readable medium that includes computer program code to enable a computer infrastructure to optimize a data library. To this extent, the computer-readable medium includes program code, such as data library optimizing system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to optimize a data library, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for optimizing a data library. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of optimizing a data library, comprising:
    moving a plurality of data files from a plurality of data library volumes to a staging area;
    monitoring a utilization of the staging area;
    sorting the data files into a plurality of directories based on at least one criterion of the data files;
    transferring data files meeting a first criterion from a first directory in the staging area to a transfer medium;
    deleting the first directory and the files it contains;
    transferring data files meeting a second criterion from a second directory in the staging area to a transfer medium; and
    deleting the second directory and the files it contains.

2. The method of claim 1, further comprising:
ordering the plurality of data library volumes based on the at least one criterion of data files.

3. The method of claim 1, wherein the at least one criterion is selected from a group consisting of: creation date, creation time, modification date, modification time, archive date, archive time, file size, file format, and sequence number.

4. The method of claim 1, further comprising:
determining an optimal size of the staging area.

5. The method of claim 1, wherein sorting includes appending to a file name of each data file an identifier based on the at least one criterion.

6. The method of claim 1, wherein monitoring includes:
determining whether an upper utilization threshold has been exceeded; and
in the case that the utilization threshold has been exceeded, initiating the transfer of data files from the first directory to the transfer medium.

7. The method of claim 6, wherein monitoring further includes:
determining whether a lower utilization threshold has been met;
determining whether all data files have been moved to the staging area; and
in the case that the lower utilization threshold has been met and all data files have not been moved to the staging area, ceasing the transfer of data files to the transfer medium.

8. A system comprising:
at least one computing device for optimizing a data library by performing a method comprising:
moving a plurality of data files from a plurality of data library volumes to a staging area;
monitoring a utilization of the staging area;
sorting the data files into a plurality of directories based on at least one criterion of the data files;
transferring data files meeting a first criterion from a first directory in the staging area to a transfer medium;
deleting the first directory and the files it contains;
transferring data files meeting a second criterion from a second directory in the staging area to a transfer medium; and
deleting the second directory and the files it contains.

9. The system of claim 8, wherein the method further comprises:
ordering the plurality of data library volumes based on the at least one criterion of data files.

10. The system of claim 8, wherein the method further comprises:
determining an optimal size of the staging area.

11. The system of claim 8, wherein monitoring the utilization of the staging area includes:
determining whether an upper utilization threshold has been exceeded; and
in the case that the utilization threshold has been exceeded, initiating the transfer of data files from the first directory to the transfer medium.

12. The system of claim 11, wherein monitoring the utilization of the staging area further includes:
determining whether a lower utilization threshold has been met;
determining whether all data files have been moved to the staging area; and
in the case that the lower utilization threshold has been met and all data files have not been moved to the staging area, ceasing the transfer of data files to the transfer medium.

13. A program product stored on a computer-readable storage medium, which when executed, optimizes a data library, by performing a method comprising:
moving a plurality of data files from a plurality of data library volumes to a staging area;
monitoring a utilization of the staging area;
sorting the data files into a plurality of directories based on at least one criterion of the data files;
transferring data files meeting a first criterion from a first directory in the staging area to a transfer medium;
deleting the first directory and the files it contains;
transferring data files meeting a second criterion from a second directory in the staging area to a transfer medium; and
deleting the second directory and the files it contains.

14. The program product of claim 13, wherein the method further comprises:
ordering the plurality of data library volumes based on the at least one criterion of data files.

15. The program product of claim 13, wherein the method further comprises:
determining an optimal size of the staging area.

16. The program product of claim 13, wherein monitoring the utilization of the staging area comprises:
determining whether an upper utilization threshold has been exceeded;
initiating the transfer of data files from the first directory to the transfer medium;
determining whether a lower utilization threshold has been met;
determining whether all data files have been moved to the staging area; and
ceasing the transfer of data files to the transfer medium.

17. A method for deploying an application for optimizing a data library, comprising:
providing a computer infrastructure being operable to:
move a plurality of data files from a plurality of data library volumes to a staging area;
monitor a utilization of the staging area;
sort the data files into a plurality of directories based on at least one criterion of the data files;
transfer data files meeting a first criterion from a first directory in the staging area to a transfer medium;
delete the first directory and the files it contains;
transfer data files meeting a second criterion from a second directory in the staging area to a transfer medium; and
delete the second directory and the files it contains.

18. The method of claim 17, wherein the computer infrastructure is further operable to:
order the plurality of data library volumes based on the at least one criterion of data files.

* * * * *